W. TYZACK, A. WRIGHT AND H. SENIOR.
CUTLERY GRINDING MACHINE.
APPLICATION FILED AUG. 14, 1919.
1,355,870. Patented Oct. 19, 1920.
3 SHEETS—SHEET 1.
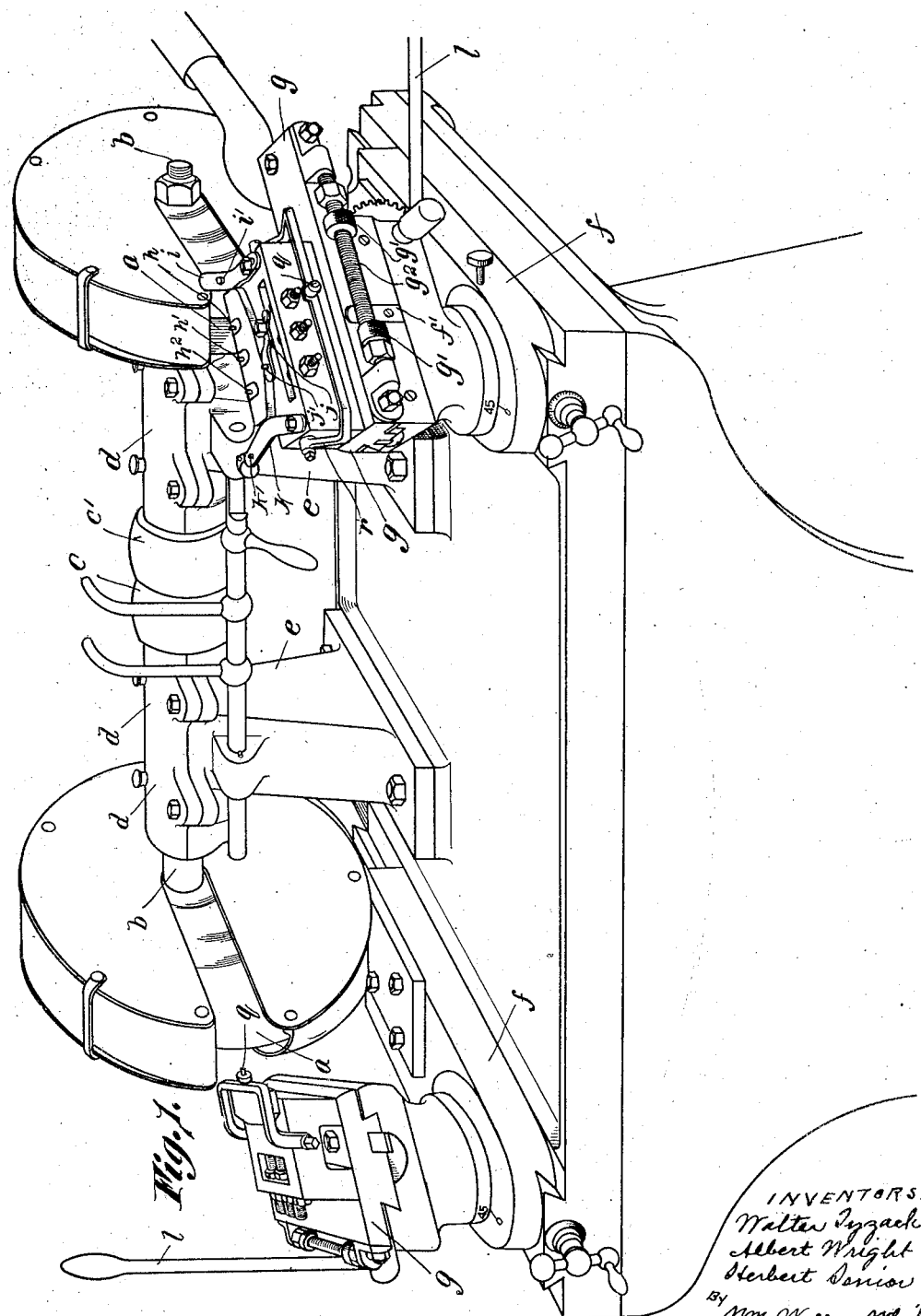

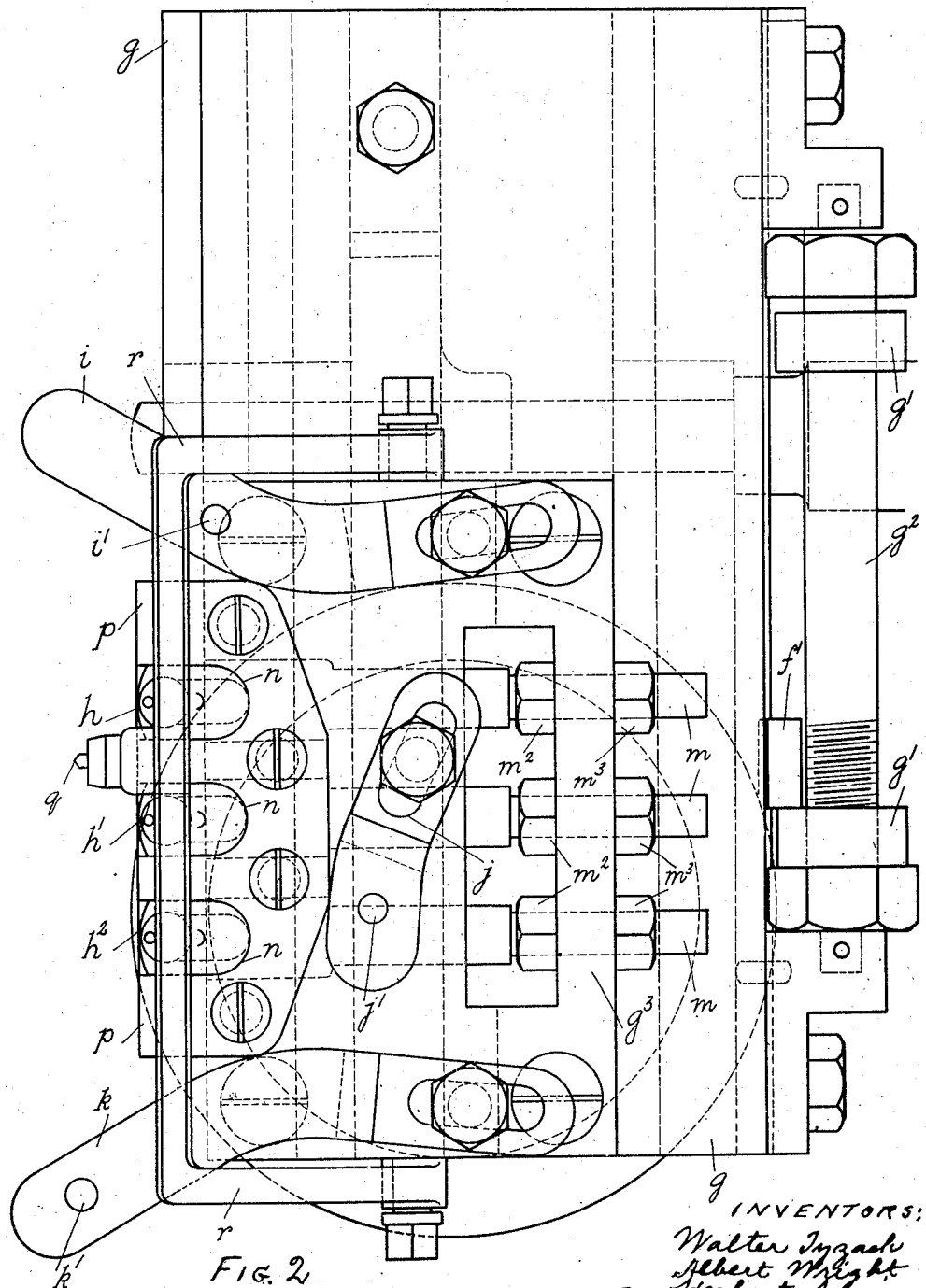

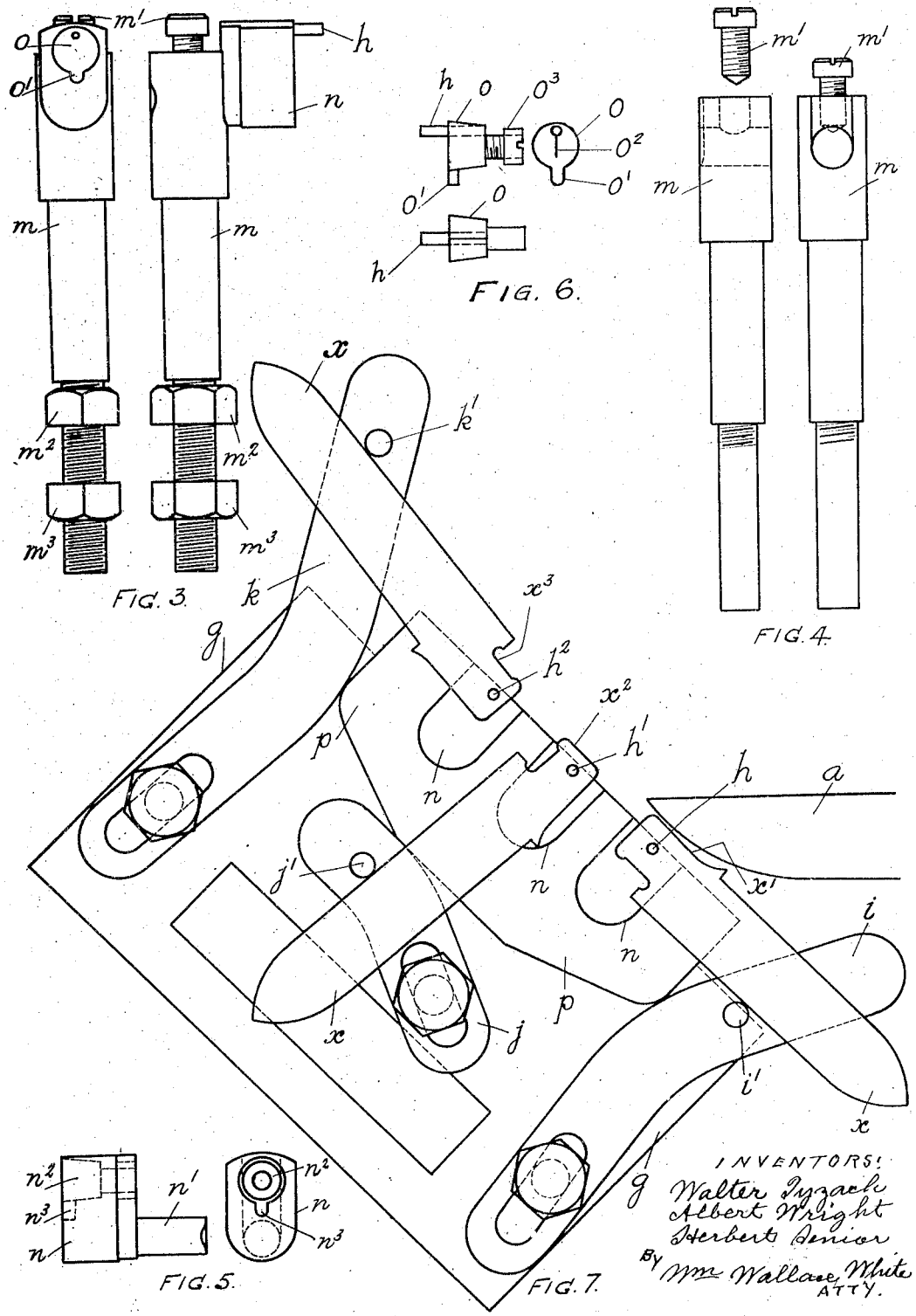

UNITED STATES PATENT OFFICE.

WALTER TYZACK, ALBERT WRIGHT, AND HERBERT SENIOR, OF SHEFFIELD, ENGLAND.

CUTLERY-GRINDING MACHINE.

1,355,870.  Specification of Letters Patent.  Patented Oct. 19, 1920.

Application filed August 14, 1919. Serial No. 317,447.

*To all whom it may concern:*

Be it known that we, WALTER TYZACK, ALBERT WRIGHT, and HERBERT SENIOR, subjects of the King of Great Britain and Ireland, residing at Sheffield, in the county of York, England, have invented new and useful Improvements in Cutlery-Grinding Machines, of which the following is a specification.

This invention relates to cutlery grinding machines the object of the invention being to provide an improved machine for performing the final shaping or "squaring" of the tang end of pen or pocket knife blades, and to this end the invention consists in providing such a machine with a specially constructed work holder by means of which a blade may be rigidly held during the grinding thereof.

Our invention will be better understood on reference to the accompanying drawings in which:—

Figure 1 is a perspective view of a double ended machine made according to our invention.

Fig. 2 is a plan view of the work holding slide.

Fig. 3 shows a plan and side elevation of bolts and pin fixture, forming part of the work slide.

Fig. 4 shows a similar pair of views of the bolt with the pin fixture removed.

Fig. 5 shows a side elevation and plan of the pin fixture.

Fig. 6 shows three views of the pin carrier separated from the pin fixture.

Fig. 7 is an outline plan of the work slide showing the relative positions of a blade when in position for all three grinding operations.

The same letters refer to similar parts throughout the several views.

Referring to Fig. 1 it will be seen that a pair of grinding wheels $a$, $a$ with driving spindle $b$ and fast and loose pulleys $c$ $c^1$ are mounted in bearings $d$ $d$ on pedestals $e$ $e$. In convenient proximity to each grinding wheel $a$ is placed a screw actuated sliding headstock $f$ carrying a transversely sliding work holder $g$ which can also be turned about a pivot point on the headstock to place it at any desired angle to the grinding wheel.

In connection with the work holder $g$ there are provided pins $h$ $h^1$ $h^2$ the purpose of which, as shown in Fig. 7, is to engage with the hole in the tang of the blade. On the upper face of the work holder there are also three adjustable arms $i$, $j$ and $k$ carrying stops $i^1$, $j^1$ and $k^1$ respectively, which stops serve as abutments for the blades to be ground and also insure the said blades being correctly placed in relation to the grinding wheel.

The work holder $g$ may be moved to and fro on the headstock $f$ by lever and link motion, or by rack and pinion mechanism, the latter form of actuating means being partially indicated in Fig. 1, the operating handle being marked $l$. The work holder $g$ is limited in its travel by adjustable stops $g^1$ $g^1$ on the bolt $g^2$ on the side of the work holder, engaging with a fixed stop $f^1$ on the headstock $f$.

To insure perfect rigidity and true alinement, the blade carrying pins $h$ $h^1$ $h^2$ are each mounted on a specially constructed fitting. Details of these fittings are shown in Figs. 3 to 6. In each case a stepped bolt $m$ is bored out at the large end to receive the shank $n^1$ of a bracket or pin fixture $n$, the said shank being secured by a set screw $m^1$. The pin fixture $n$, as shown in Fig. 5 is formed with a tapering hole $n^2$ and a side recess $n^3$. Into the hole $n^2$ is fitted a tapering pin carrier $o$ with lug $o^1$ to engage the recess $n^3$ and thus prevent rotation of the carrier. A hole in the carrier receives a pin (such as $h$) and a saw cut $o^2$ insures the pin being tightly gripped when the carrier $o$ is pulled firmly down into the hole $n^2$ by the set screw $o^3$.

The pin fixtures $n$ lie in slots in a plate $p$ on the work holder $g$ and are adjustable therein by means of the nuts $m^2$ $m^3$ on the bolts $m$ abutting against the web $g^3$ of the holder. In this way the position of the pins in relation to the grinding wheel can be regulated as desired.

A diamond $q$ for dressing the face of the grinding wheel is carried in a pivoted bridle $r$ so that it can be turned out of the way when not required.

The manner of using our improved machine is indicated in Fig. 7. A blade $x$ is placed on the pin $h$ with the back bearing against the stop $i^1$. The holder $g$ is then traversed so that the face $x^1$ of the tang of the blade is drawn across the revolving stone $a$. If it is desired that the tang shall have a square end, the blade is moved onto the pin $h^1$ and placed so that the back of the blade bears against the stop $j^1$. By a similar movement of the holder $g$ the end face $x^2$ of the tang is trued up on the stone. The blade is then placed on the third pin $h^2$ with its back bearing against the stop $k^1$ and the face $x^3$ of the tang ground as before described.

It will be understood that the wheel $a$ may be of any convenient configuration; in Fig. 7 it is shown cup-shaped as that is a section we have found to answer our purposes very well.

Having now described our invention what we claim and desire to secure by Letters Patent is:—

1. In a cutlery grinding machine for finally shaping or squaring the "tang" ends of pen or pocket knife blades, work holder fittings, comprising stepped bolts, each with a pin fixture, non-rotatable tapering pin carrier, and securing means.

2. The combination with a cutlery grinding machine, of a work holder comprising an adjustable stepped bolt provided with a radially extending opening, a bracket removably secured in said opening, and a work-holding member removably secured in said bracket, said member and bracket being provided with coöperating means for preventing rotation of the work-holding member.

In testimony whereof we have signed our names to this specification.

WALTER TYZACK.
ALBERT WRIGHT.
HERBERT SENIOR.